US 8,438,324 B2

(12) United States Patent
Cho (10) Patent No.: US 8,438,324 B2
(45) Date of Patent: May 7, 2013

(54) RAID-BASED STORAGE CONTROL BOARD HAVING FIBRE CHANNEL INTERFACE CONTROLLER

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 0 days.

(21) Appl. No.: 13/018,504

(22) Filed: Feb. 1, 2011

(65) Prior Publication Data

US 2012/0198116 A1 Aug. 2, 2012

(51) Int. Cl.
*G06F 13/14* (2006.01)
*G06F 13/00* (2006.01)

(52) U.S. Cl.
USPC .............. 710/305; 710/300; 710/62; 710/74; 711/111

(58) Field of Classification Search .............. 710/62, 710/74, 300, 305–306; 711/100, 111–114
See application file for complete search history.

(56) References Cited

U.S. PATENT DOCUMENTS

| | | | | |
|---|---|---|---|---|
| 5,953,352 | A * | 9/1999 | Meyer ........................... | 714/820 |
| 6,529,989 | B1 * | 3/2003 | Bashford et al. .............. | 710/306 |
| 7,120,826 | B2 * | 10/2006 | Fore et al. ..................... | 714/6.2 |
| 7,743,178 | B2 * | 6/2010 | Warren et al. ................. | 710/30 |
| 2003/0097487 | A1 * | 5/2003 | Rietze et al. .................. | 709/325 |
| 2005/0010920 | A1 * | 1/2005 | Lin et al. ....................... | 717/176 |
| 2006/0106982 | A1 * | 5/2006 | Ashmore et al. .............. | 711/114 |
| 2006/0143505 | A1 * | 6/2006 | Olarig et al. .................. | 714/6 |
| 2006/0161707 | A1 * | 7/2006 | Davies et al. ................. | 710/268 |
| 2006/0161709 | A1 * | 7/2006 | Davies ........................... | 710/268 |
| 2006/0191709 | A1 * | 8/2006 | Kim et al. ..................... | 174/255 |
| 2008/0201616 | A1 * | 8/2008 | Ashmore ........................ | 714/57 |
| 2008/0271026 | A1 * | 10/2008 | Haugh ........................... | 718/102 |
| 2009/0094620 | A1 * | 4/2009 | Kalwitz et al. ................ | 719/325 |
| 2009/0279554 | A1 * | 11/2009 | Kastner et al. ................ | 370/400 |
| 2011/0072290 | A1 * | 3/2011 | Davis et al. ................... | 713/324 |
| 2011/0191641 | A1 * | 8/2011 | Tashima ........................ | 714/54 |
| 2011/0252250 | A1 * | 10/2011 | Cho ............................... | 713/300 |
| 2011/0258365 | A1 * | 10/2011 | Cho ............................... | 711/103 |
| 2011/0258382 | A1 * | 10/2011 | Cho ............................... | 711/114 |
| 2011/0271143 | A1 * | 11/2011 | Cho ............................... | 714/14 |
| 2011/0283047 | A1 * | 11/2011 | Cho ............................... | 711/103 |
| 2011/0320690 | A1 * | 12/2011 | Petersen et al. ............... | 711/103 |

OTHER PUBLICATIONS

"Serial-attached SCSI", Definition from SearchStorage.com Definitions, Jan. 27, 2011, 2 pages. http://searchstorge.techtarget.com/sDefinition/0,,sid5_gci1026971,00.html.

"Fibre Channel", Definition from SearchStorge.com Definitions, Jan. 27, 2011, 2pages. http://searchstorge.techtarget.com/sDefinition/0,,sid5_gci212114,00.html.

* cited by examiner

*Primary Examiner* — Christopher B Shin (74) *Attorney, Agent, or Firm* — Saliwanchik, Lloyd & Eisenschenk (57) ABSTRACT

Embodiments of the present invention relate to a (e.g., hybrid) redundant array of independent disks (RAID)-based storage control board having a fiber channel interface controller. Specifically, the present invention relates to a storage control board having a RAID controller with a peripheral component interconnect express (PCI-e) interface and a fiber channel interface controller. In one embodiment, the RAID controller is coupled to an input/output (I/O) hub and a set (at least one) of PCI-e slots, which themselves can receive cards such as a fiber channel (FC) add-on card, a serial attached small component system interface (SAS) add-on card, or a PCI-e bridge add-on card. The I/O hub can be coupled to a set of processors, each of which can be coupled to a main memory module or the like.

20 Claims, 8 Drawing Sheets

RAID-BASED STORAGE CONTROL BOARD HAVING FIBRE CHANNEL INTERFACE CONTROLLER

CROSS-REFERENCE TO RELATED APPLICATIONS

This application is related in some aspects to commonly-owned and co-pending U.S. patent application Ser. No. 12/763,688, entitled "RAID CONTROLLER FOR A SEMICONDUCTOR STORAGE DEVICE", filed Apr. 20, 2010, the entire contents of which are herein incorporated by reference. This application is related in some aspects to commonly-owned and co-pending U.S. patent application Ser. No. 12/848,281, entitled "HYBRID RAID CONTROLLER", filed Aug. 2, 2010, the entire contents of which are herein incorporated by reference. This application is also related in some aspects to commonly-owned and co-pending U.S. patent application Ser. No. 12/848,348, entitled "RAID CONTROLLER HAVING MULTI PCI BUS SWITCHING", filed Aug. 2, 2010, the entire contents of which are herein incorporated by reference. This application is also related in some aspects to commonly-owned and co-pending U.S. patent application Ser. No. 12/885,518, entitled "HYBRID RAID CONTROLLER HAVING MULTI PCI BUS SWITCHING", filed Sep. 19, 2010, the entire contents of which are herein incorporated by reference. This application is also related in some aspects to commonly-owned and co-pending application U.S. patent application Ser. No. (to be provided), entitled "RAID-BASED STORAGE CONTROL BOARD", having attorney docket number SSD-0016, which was filed on Feb. 1, 2011, the entire contents of which are herein incorporated by reference.

FIELD OF THE INVENTION

The present invention relates to a (e.g., hybrid) redundant array of independent disks (RAID)-based storage control board. Specifically, the present invention relates to a storage control board having a hybrid RAID controller with a peripheral component interconnect express (PCI-e) interface and a fibre channel interface controller.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

In general, embodiments of the present invention relate to a (e.g., hybrid) redundant array of independent disks (RAID)-based storage control board having a fibre channel interface controller. Specifically, the present invention relates to a storage control board having a RAID controller with a peripheral component interconnect express (PCI-e) interface and a fibre channel (FC) interface controller. In one embodiment, the RAID controller is coupled to an input/output (I/O) hub and a set (at least one) of PCI-e slots, which themselves can receive cards such as a fibre channel (FC) add-on card, a serial attached small component system interface (SAS) add-on card, or a PCI-e bridge add-on card. The I/O hub can be coupled to the FC interface controller and a set (at least one) of processors. Each of the set of processors can be coupled to a main memory module or the like.

A first aspect of the present invention provides a redundant array of independent disks (RAID)-based storage control board, comprising: a RAID controller having a peripheral component interconnect express (PCI-e) interface; an input/output (I/O) hub coupled to the raid controller; a fibre channel (FC) interface controller coupled to the I/O hub; and a set of PCI-e slots coupled to the raid controller.

A second aspect of the present invention provides a redundant array of independent disks (RAID)-based storage control board, comprising: a RAID controller having a peripheral component interconnect express (PCI-e) interface, the RAID controller comprising: a set of disk mounts coupled to a set of SSD memory disk units, the set of SSD memory disk units comprising: a set of volatile semiconductor memories; a set of disk monitoring units coupled to the set of disk mounts for monitoring the set of SSD memory disk units; a set of disk plug and play controllers coupled to the set of disk monitoring units and the set of disk mounts for controlling the set of disk mounts; a set of high-speed host interfaces coupled to the set of disk monitoring units and the set of disk mounts for providing high-speed host interface capabilities; an input/output (I/O) hub coupled to the raid controller; a fibre channel (FC) interface controller coupled to the I/O hub; and a set of PCI-e slots coupled to the raid controller.

A third aspect of the present invention provides a method for producing a redundant array of independent disks (RAID)-based storage control board, comprising: providing a RAID controller having a peripheral component interconnect express (PCI-e) interface; coupling an input/output (I/O) hub to the raid controller; coupling a fibre channel (FC) interface controller to the I/O hub; and coupling a set of PCI-e slots to the raid controller.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a hybrid RAID-based storage control board of a PCI-Express (PCI-e) type according to an embodiment of the present invention will be described in detail with reference to the accompanying drawings.

In general, embodiments of the present invention relate to a (e.g., hybrid) redundant array of independent disks (RAID)-based storage control board having a fibre channel interface controller. Specifically, the present invention relates to a storage control board having a RAID controller with a peripheral component interconnect express (PCI-e) interface and a fibre channel (FC) interface controller. In one embodiment, the RAID controller is coupled to an input/output (I/O) hub and a set (at least one) of PCI-e slots, which themselves can receive cards such as a fibre channel (FC) add-on card, a serial attached small component system interface (SAS) addon card, or a PCI-e bridge add-on card. The I/O hub can be coupled to the FC interface controller and a set (at least one) of processors. Each of the set of processors can be coupled to a main memory module or the like.

Provided is a RAID-based (e.g., hybrid RAID-based) storage control board of a PCI-Express (PCI-e) type, which provides data storage/reading services through a PCI-Express interface and which includes a FC interface controller. The RAID controller typically includes a disk mount coupled to a set (at least one) of PCI-Express SSD memory disk units, the set of PCI-Express SSD memory disk units comprising a set of volatile semiconductor memories; a disk monitoring unit coupled to the disk mount for monitoring the set of PCI-Express memory disk units; a disk plug and play controller coupled to the disk monitoring unit and the disk mount for controlling the disk mount; a high-speed host interface coupled to the disk monitoring unit and the disk mount for providing high-speed host interface capabilities; a disk controller coupled to the high-speed host interface and the disk monitoring unit; and a host interface coupled to the disk controller.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Figure 1:
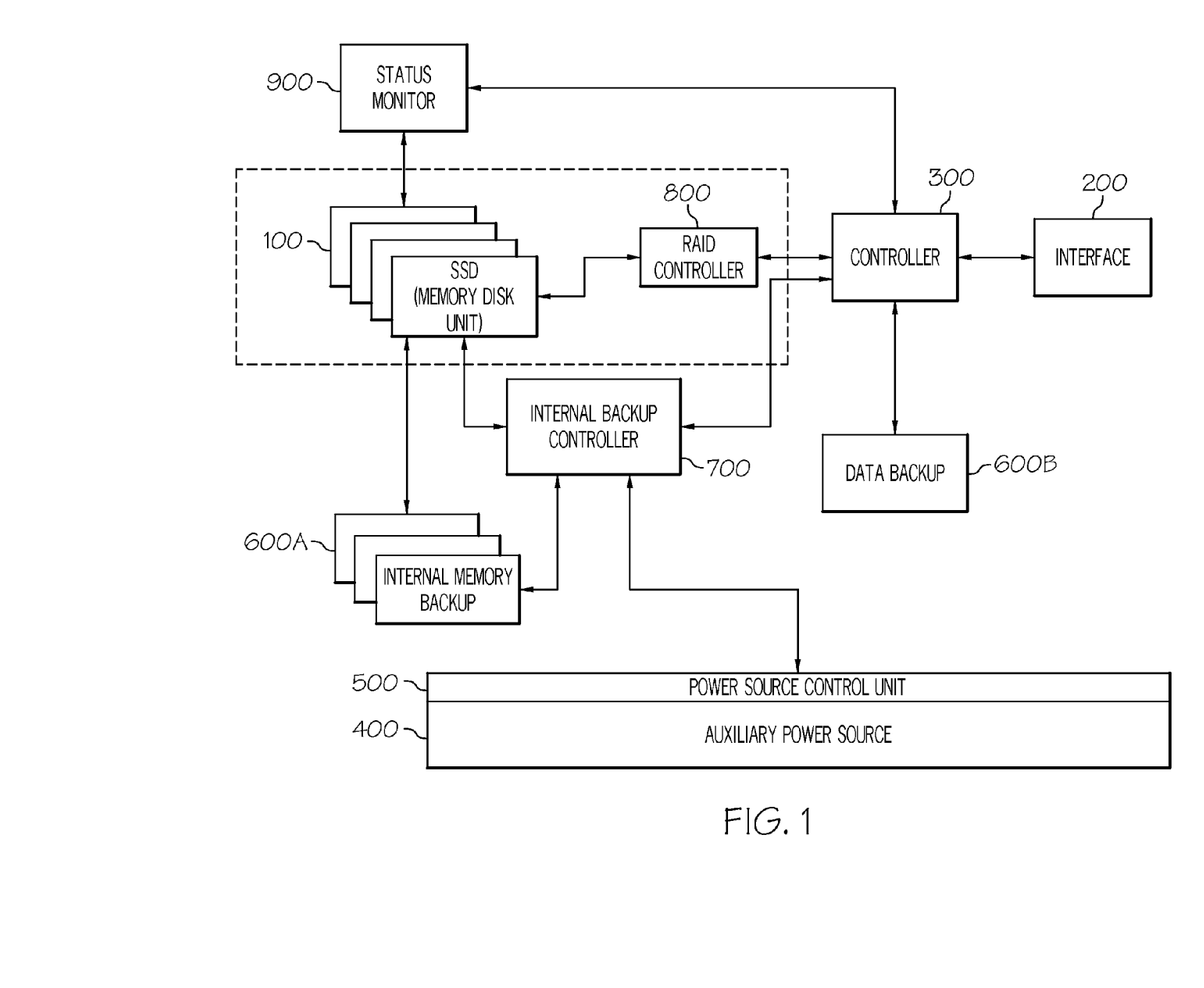
FIG. 1 is a diagram schematically illustrating a configuration of a RAID-controlled storage device of a PCI-Express (PCI-e) type according to an embodiment of the present invention.

Referring now to FIG. 1, a diagram schematically illustrating a configuration of a PCI-Express type, RAID-controlled storage device (e.g., for providing storage for a PCI-Express (PCI-e) type is shown. As depicted, FIG. 1 shows a RAID-controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit(s) 600A-B that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
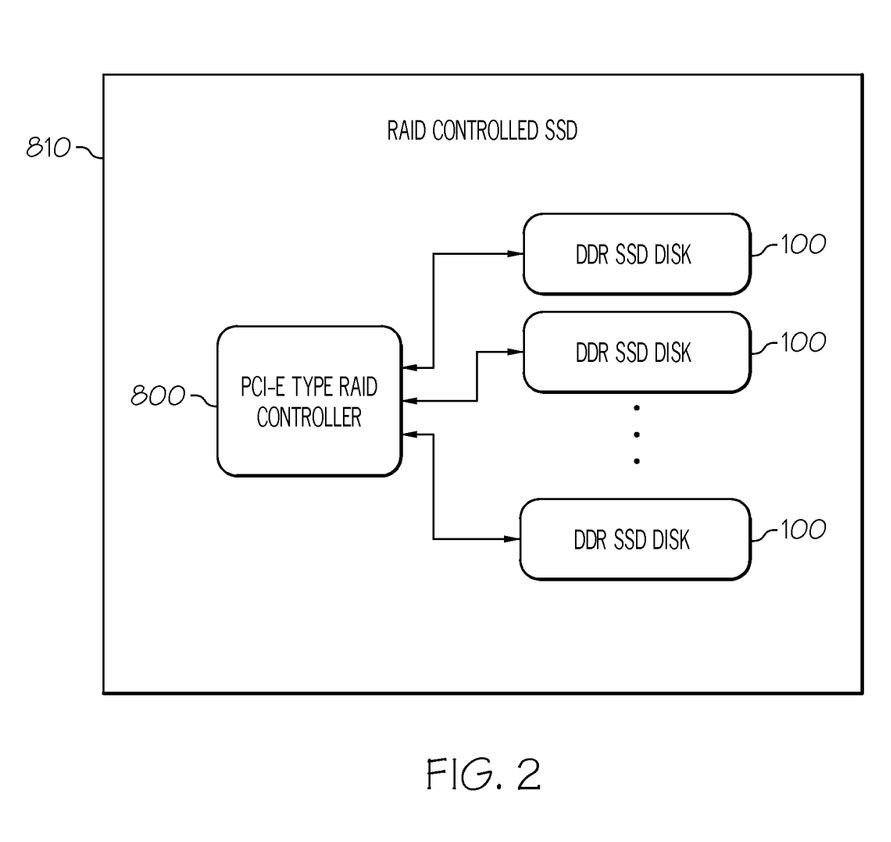
FIG. 2 is a more specific diagram of a RAID controller coupled to a set of SSDs according to an embodiment of the present invention.

Referring now to FIG. 2, a more detailed diagram of a RAID-controlled SSD 810 is shown. As depicted, a PCI-e type RAID controller 800 can be directly coupled to any quantity of SSDs 100. Among other things, this allows for optimum control of SSDs 100. The use of a RAID controller 800:
1. Supports the current backup/restore operations.
2. Provides additional and improved backup function by performing the following:
   a) the internal backup controller determines the backup (user's request order or the status monitor detects power supply problems);
   b) the Internal backup controller requests a data backup to SSDs;
   c) the internal backup controller requests internal backup device to backup data immediately;
   d) monitors the status of the backup for the SSDs and internal backup controller; and
   e) reports the internal backup controller's status and end-op.
3. Provides additional and improved restore function by performing the following:
   a) the internal backup controller determines the restore (user's request order or the status monitor detects power supply problems);
   b) the internal backup controller requests a data restore to the SSDs;
   c) the internal backup controller requests internal backup device to restore data immediately;
   d) monitors the status of the restore for the SSDs and internal backup controller; and
   e) reports the internal backup controller status and end-op.

Figure 3:
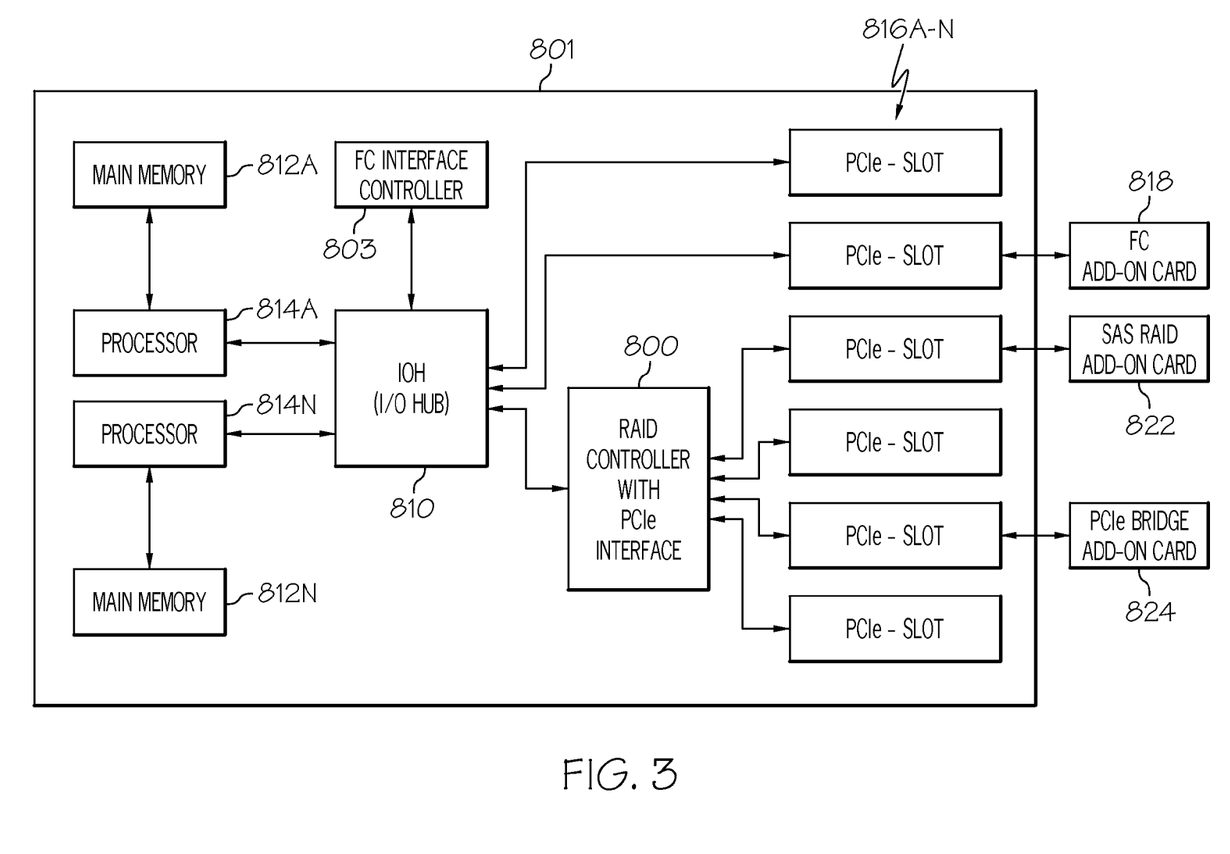
FIG. 3 is a hybrid RAID-based storage control board according to an embodiment of the present invention.

Referring now to FIG. 3, a storage control board (board 801) according to an embodiment of the present invention is shown. As depicted, board 801 comprises a RAID controller with PCI-e interface (RAID controller 800), which is coupled to a set of PCI-e slots 816A-N as well as an input/output (I/O) hub 810. Coupled to I/O hub 810 is a FC interface controller 803. The set of processors 814A-N are coupled to main memory modules 812A-N. Coupled to PCI-e slots 816A-N are fibre channel (FC) add-on card 818, serial attached small component system interface (SAS) RAID add-on card 822, and PCI-e bridge add-on card 824.

In general, FC interface controller 803 controls FC devices that may be coupled to storage control board 801. Fibre Channel is a technology for transmitting data between computer devices at data rates of up to 4 Gbps (and 10 Gbps in the near future). Fibre Channel is especially suited for connecting computer servers to shared storage devices and for interconnecting storage controllers and drives. Since Fibre Channel is three times as fast, it has begun to replace the Small Computer System Interface (SCSI) as the transmission interface between servers and clustered storage devices. Fibre channel is more flexible; devices can be as far as ten kilometers (about six miles) apart if optical fibre is used as the physical medium. Optical fibre is not required for shorter distances, however, because Fibre Channel also works using coaxial cable and ordinary telephone twisted pair.

Fibre Channel offers point-to-point, switched, and loop interfaces. It is designed to interoperate with SCSI, the Internet Protocol (IP) and other protocols, but has been criticized for its lack of compatibility—primarily because (like in the early days of SCSI technology) manufacturers sometimes interpret specifications differently and vary their implementations. Standards for Fibre Channel are specified by the Fibre Channel Physical and Signaling standard, and the ANSI X3.230-1994, which is also ISO 14165-1. (This definition extracted from TechTarget.com also referred to as Whatis-.com.)

Figure 4A:
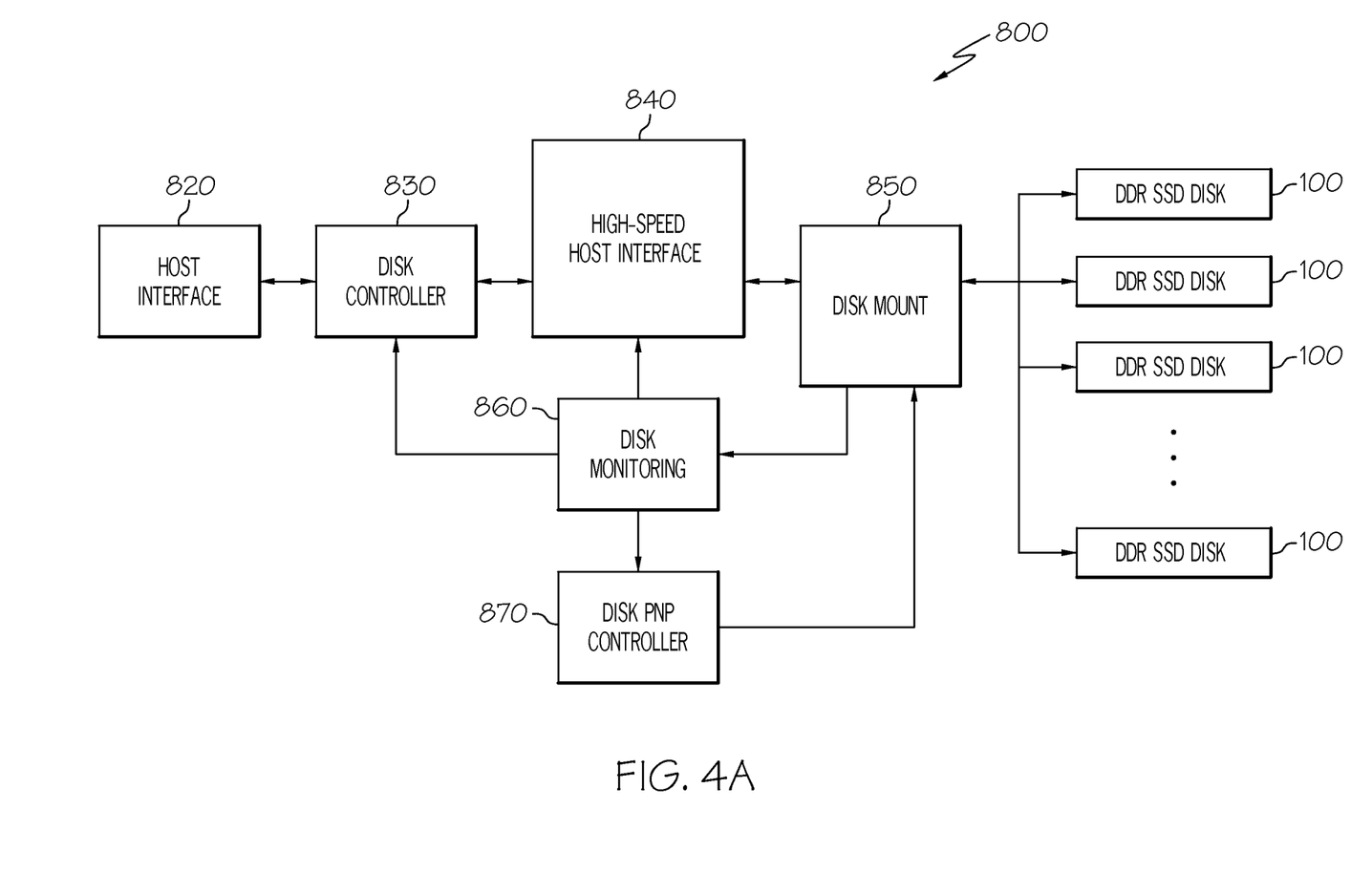
FIG. 4A is a diagram of the RAID controller of FIGS. 1-3 according to an embodiment of the present invention.

Referring now to FIG. 4A, a diagram of the RAID controller 800 of FIGS. 1 and 2 as coupled to a set (at least one) of SSDs 100 is shown in greater detail. The coupling to SSDs 100 to RAID controller 800 can be in addition to the coupling to I/O hum 810 and PCI-e slots 816A-N shown in FIG. 3. As depicted, the RAID controller generally comprises: a host interface 820; a disk controller 830 coupled to host interface 820; and a high-speed host interface 840. Also coupled to disk controller 830 is a disk monitoring unit 860, which is coupled to the disk mount 850. In general, SSDs 100 are mounted on disk mount 850 and are detected by disk monitoring unit 860. In addition, disk plug and play (PnP controller) controls the functions and/or detection functions related to disk mount 850. In general, RAID controller 100 controls the operation of SSDs 100. This includes the detection of SSDs 100, the storage and retrieval of data therefrom, etc.

Figure 4B:
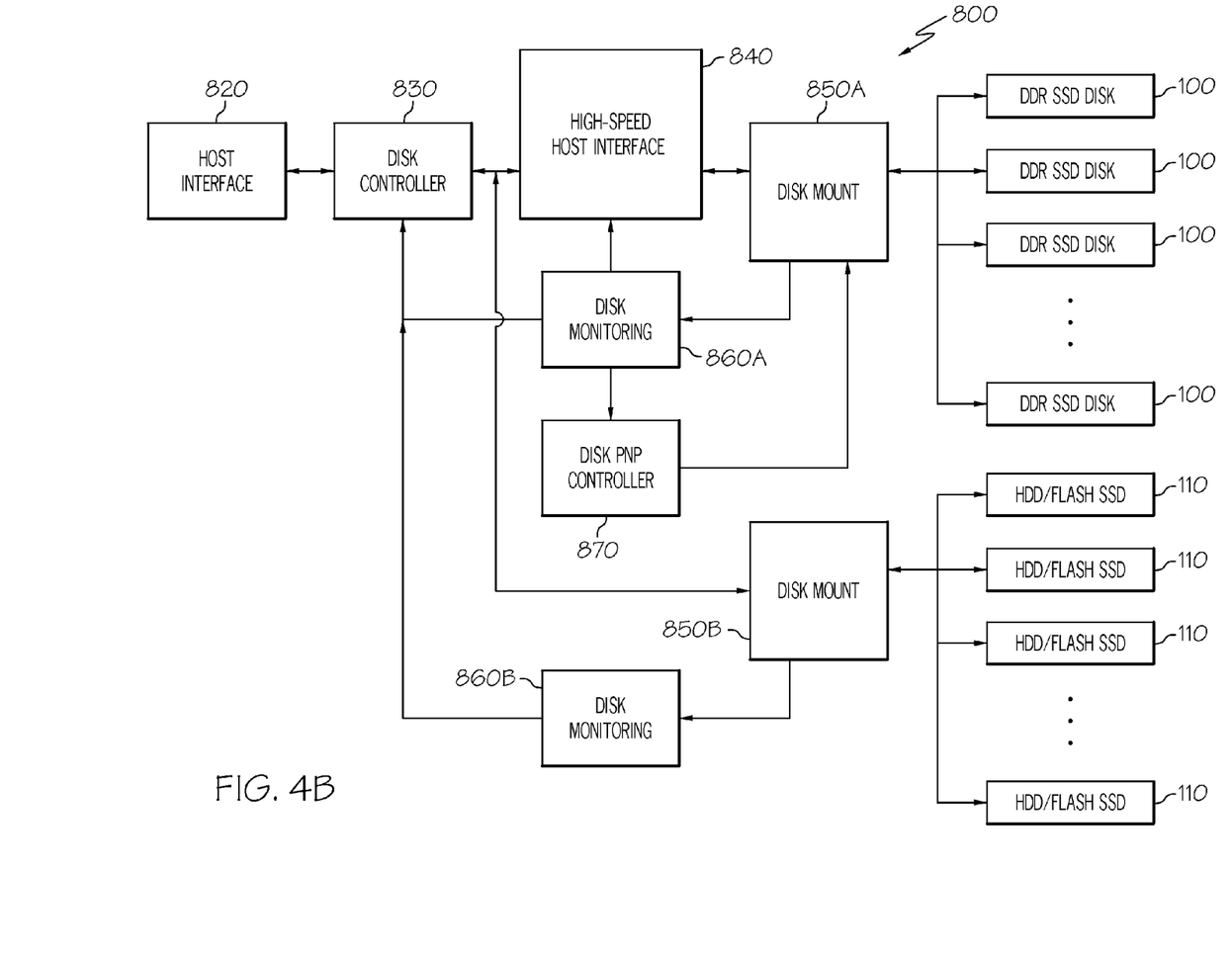
FIG. 4B is an alternate diagram of the RAID controller of FIGS. 1-3 according to an embodiment of the present invention.
Figure 4C:
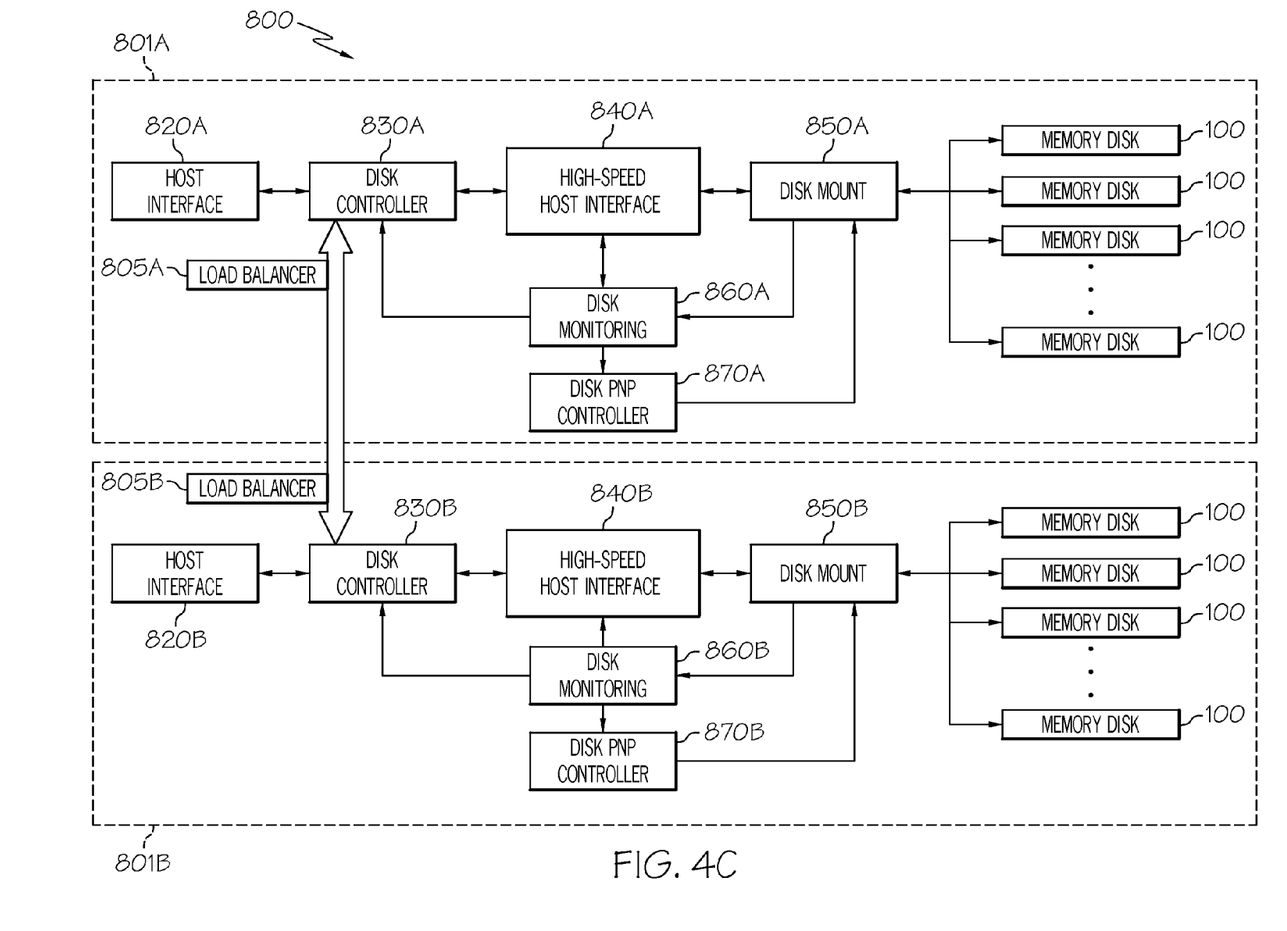
FIG. 4C is another alternate diagram of the RAID controller of FIGS. 1-3 according to an embodiment of the present invention.

It is understood that RAID controller 800 can have any of the configurations set forth in any of the above-incorporated patent applications. This can include the presence of multiple instances of any of the components shown in FIG. 4A, load balancers, etc. For example, as shown in FIG. 4B, RAID controller 800 could include an additional disk monitoring unit 860B coupled to disk controller 830, an additional disk mount 850B coupled to the additional disk monitoring unit, and a set of memory units such as SSDs or High Density Drive (HDD)/Flash memory units 110 coupled to the additional disk mount 850B. Still yet, as that shown in FIG. 4C, two or more sets of components (e.g., 820A-B, 830A-B, 840A-B, 850A-B, 860A-B, etc.) could be provided. The two or more sets of similar components sets can be interconnected via a load balancer(s) 805A-B and PCI bus 803.

Figure 5:
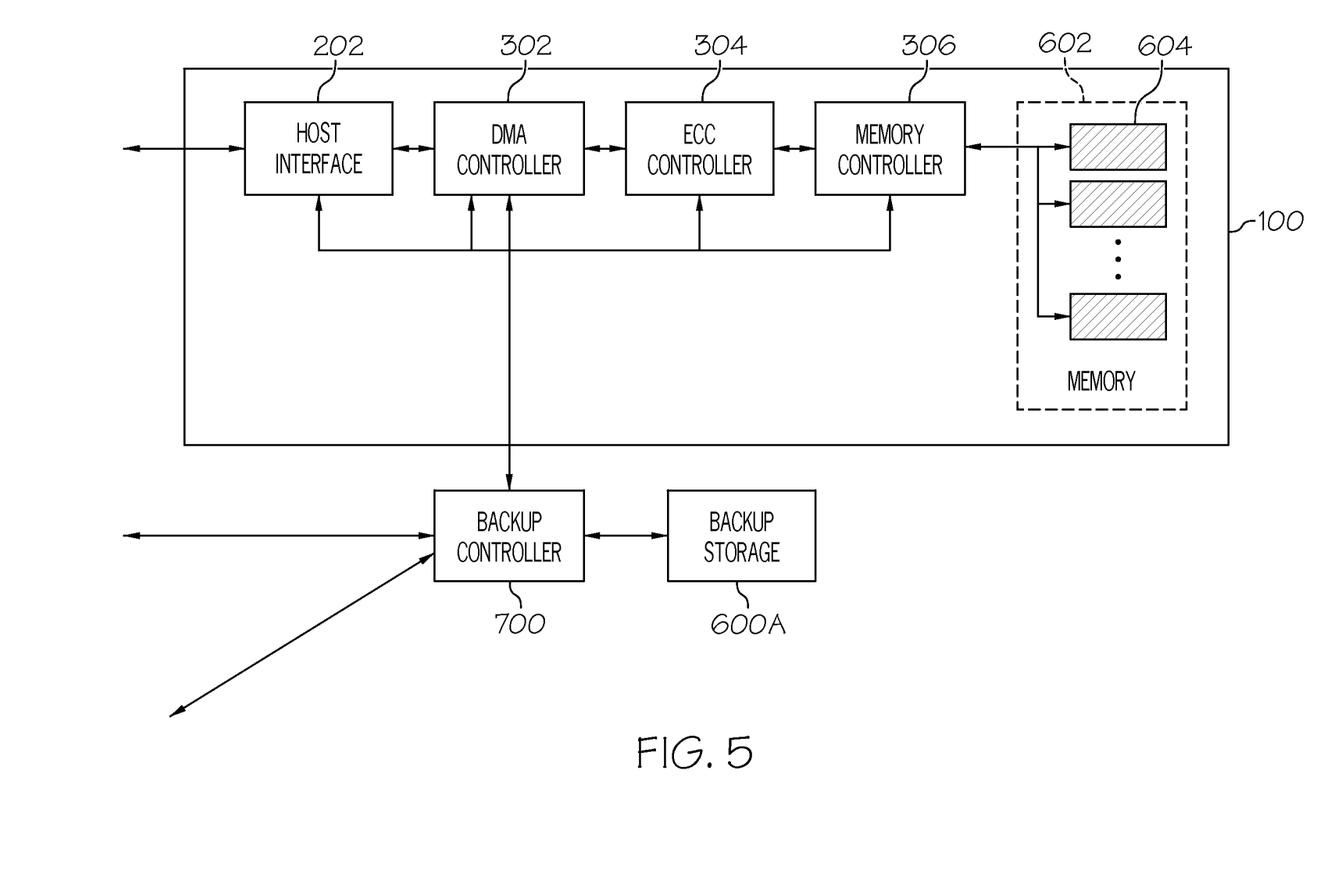
FIG. 5 is a diagram schematically illustrating a configuration of the high-speed SSD of FIG. 1 according to an embodiment of the present invention.

Referring now to FIG. 5, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller 304; and a memory controller 306 for controlling one or more blocks 604 of memory 602 that are used as high-speed storage.

Figure 6:
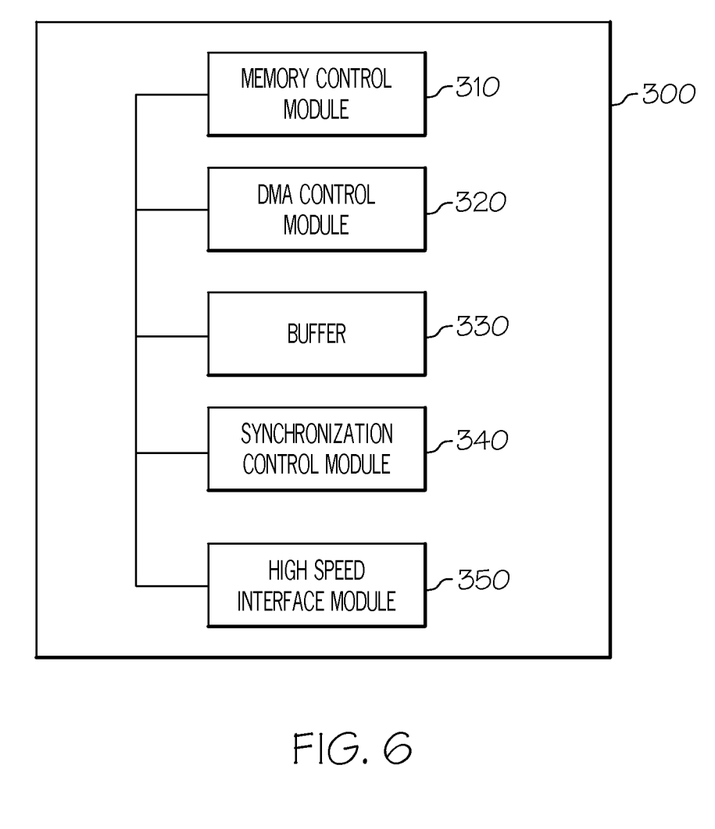
FIG. 6 is a diagram schematically illustrating a configuration of a controller unit in FIG. 1 according to an embodiment of the present invention.

FIG. 6 is a diagram schematically illustrating a configuration of the controller unit provided in the PCI-Express type storage device according to the embodiment. Referring to FIG. 6, the controller unit 300 according to one embodiment includes: a memory control module 310 which controls data input/output of the memory disk unit 100; a DMA (Direct Memory Access) control module 320 which controls the memory control module 310 to store the data in the memory disk unit 100, or reads data from the memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and, when receiving a data signal from the host through the PCI-Express host interface unit 200, adjusts synchronization of the data signal so as to have a transmission speed corresponding to a communications protocol (for example, PCI, PCI-x, or PCI-e, and the like) used by the memory disk unit 100 to transmit the synchronized data signal to the memory disk unit 100 through the DMA control module 320 and the memory control module 310; and a high-speed interface module 350 which processes the data transmitted/received between the synchronization control module 340 and the DMA control module 320 at high-speed. Here, the high-speed interface module 350 includes a buffer having a double buffer structure and a buffer having a circular queue structure and processes the data transmitted/received between the synchronization control module 340 and the DMA control module 320 without loss at high-speed by buffering the data transmitted/received between the synchronization control module 340 and the DMA control module 320 using the buffers and adjusting data clocks.

The auxiliary power source unit 400 in FIG. 1 may be configured as a rechargeable battery or the like, so that it is normally charged to maintain a predetermined power using power transferred from the host through the PCI-Express host interface unit 200, and supplies the charged power to the power source control unit 500 according to the control of the power source control unit 500.

The power source control unit 500 in FIG. 1 supplies the power transferred from the host through the PCI-Express host interface unit 200 to the controller unit 300, the memory disk unit 100, the backup storage unit(s) 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit(s) 600A-B is configured as a low-speed non-volatile storage device such as a hard disk and stores data of the memory disk unit 100.

The backup control unit 700 backs up data stored in the memory disk unit 100 in the backup storage unit 600A by controlling the data input/output of the backup storage unit 600A and backs up the data stored in the memory disk unit 100 in the backup storage unit 600A according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The RAID-controlled storage device of a PCI-Express (PCI-e) type supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A redundant array of independent disks (RAID)-based storage control board, comprising:
   a RAID controller having a peripheral component interconnect express (PCI-e) interface;
   an input/output (I/O) hub coupled to the raid controller;
   a fibre channel (FC) interface controller coupled to the I/O hub; and
   a set of PCI-e slots coupled to the raid controller;
   wherein the FC interface controller is configured to control a FC device coupled to the storage control board through the PCI-e interface.

2. The RAID-based storage control board of claim 1, further comprising:
   a set of processors coupled to the I/O hub; and
   a main memory module coupled to each of the set of processors.

3. The RAID-based storage control board of claim 1, further comprising a set of cards coupled to the set of PCI-e slots.

4. The RAID-based storage control board of claim 3, the set of cards comprising at least one of the following: an FC add-on card, a serial attached small component system interface (SAS) add-on card, or a PCI-e bridge addon card.

5. The RAID-based storage control board of claim 1, the RAID controller comprising:
   a disk mount coupled to a set of SSD memory disk units, the set of SSD memory disk units comprising a set of volatile semiconductor memories;
   a disk monitoring unit coupled to the disk mount for monitoring the set of SSD memory disk units;
   a disk plug and play controller coupled to the disk monitoring unit and the disk mount for controlling the disk mount; and
   a high-speed host interface coupled to the disk monitoring unit and the disk mount for providing high-speed host interface capabilities.

6. The RAID-based storage control board of claim 5, further comprising a disk controller coupled to the high-speed host interface and the disk monitoring unit.

7. The RAID-based storage control board of claim 6, further comprising a host interface coupled to the disk controller.

8. A redundant array of independent disks (RAID)-based storage control board, comprising:
a RAID controller having a peripheral component interconnect express (PCI-e) interface, the RAID controller comprising:
a set of disk mounts coupled to a set of SSD memory disk units, the set of SSD memory disk units comprising a set of volatile semiconductor memories;
a set of disk monitoring units coupled to the set of disk mounts for monitoring the set of SSD memory disk units;
a set of disk plug and play controllers coupled to the set of disk monitoring units and the set of disk mounts for controlling the set of disk mounts;
a set of high-speed host interfaces coupled to the set of disk monitoring units and the set of disk mounts for providing high-speed host interface capabilities;
an input/output (I/O) hub coupled to the raid controller;
a fibre channel (FC) interface controller coupled to the I/O hub; and
a set of PCI-e slots coupled to the raid controller.

9. The RAID-based storage control board of claim 8, further comprising:
a set of processors coupled to the I/O hub; and
a main memory module coupled to each of the set of processors.

10. The RAID-based storage control board of claim 8, further comprising a set of cards coupled to the set of PCI-e slots, the set of cards comprising at least one of the following: an FC add-on card, a serial attached small component system interface (SAS) add-on card, or a PCI-e bridge add-on card.

11. The RAID-based storage control board of claim 8, further comprising a set of disk controllers coupled to the set of high-speed host interfaces and the set of disk monitoring units.

12. The RAID-based storage control board of claim 11, further comprising a set of host interfaces coupled to the set of disk controllers.

13. A method for producing a redundant array of independent disks (RAID)-based storage control board, comprising:
providing a RAID controller having a peripheral component interconnect express (PCI-e) interface;
coupling an input/output (I/O) hub to the raid controller;
coupling a fibre channel (FC) interface controller to the I/O hub; and
coupling a set of PCI-e slots to the raid controller;
wherein the FC interface controller is configured to control a FC device coupled to the storage control board through the PCI-e interface.

14. The method of claim 13, further comprising:
coupling a set of processors to the I/O hub; and
coupling a main memory module to each of the set of processors.

15. The method of claim 13, further comprising coupling a set of cards to the set of PCI-e slots.

16. The method of claim 15, the set of cards comprising at least one of the following: an FC add-on card, a serial attached small component system interface (SAS) add-on card, or a PCI-e bridge add-on card.

17. The method of claim 13, the providing the RAID controller comprising:
coupling a disk mount to a set of SSD memory disk units, the set of SSD memory disk units comprising a set of volatile semiconductor memories;
coupling a disk monitoring unit to the disk mount for monitoring the set of SSD memory disk units;
coupling a disk plug and play controller to the disk monitoring unit and the disk mount for controlling the disk mount; and
coupling a high-speed host interface to the disk monitoring unit and the disk mount for providing high-speed host interface capabilities.

18. The method of claim 17, further comprising coupling a disk controller to the high-speed host interface and the disk monitoring unit.

19. The method of claim 18, further comprising coupling a host interface to the disk controller.

20. The method of claim 13, further comprising producing the RAID-based storage control board according to the method of claim 13.

* * * * *